United States Patent
Choi

(10) Patent No.: US 8,452,470 B2
(45) Date of Patent: May 28, 2013

(54) SYSTEM AND METHOD FOR STARTING CONTROL OF HYBRID VEHICLE

(75) Inventor: Seunggil Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 366 days.

(21) Appl. No.: 12/953,089

(22) Filed: Nov. 23, 2010

(65) Prior Publication Data

US 2011/0320077 A1 Dec. 29, 2011

(30) Foreign Application Priority Data

Jun. 28, 2010 (KR) .................. 10-2010-0061506

(51) Int. Cl.
*G06F 17/00* (2006.01)
(52) U.S. Cl.
USPC .................. 701/22; 701/29.1; 701/113
(58) Field of Classification Search
CPC ...................................................... B60W 20/00
USPC ........................................... 701/22, 29.1, 113
See application file for complete search history.

(56) References Cited

U.S. PATENT DOCUMENTS

| | | | | |
|---|---|---|---|---|
| 5,921,217 A * | 7/1999 | Koike et al. | ................ | 123/335 |
| 8,145,406 B2 * | 3/2012 | Satou | ................ | 701/103 |
| 2001/0008136 A1 * | 7/2001 | Kitamura et al. | ............. | 123/516 |
| 2001/0010214 A1 * | 8/2001 | Maegawa et al. | ......... | 123/339.23 |
| 2002/0077780 A1 * | 6/2002 | Liebl et al. | ................ | 702/183 |
| 2008/0035103 A1 * | 2/2008 | Barris et al. | ............. | 123/198 E |
| 2008/0071450 A1 * | 3/2008 | Kurrle et al. | ................ | 701/67 |
| 2010/0331143 A1 * | 12/2010 | Jager et al. | ................ | 477/167 |

FOREIGN PATENT DOCUMENTS

| | | |
|---|---|---|
| JP | 2003200759 A | 7/2003 |
| JP | 2005140271 A | 6/2005 |
| JP | 2006017042 A | 1/2006 |
| KR | 10-2009-0128830 A | 12/2009 |

* cited by examiner

Primary Examiner — Hussein A. Elchanti
(74) Attorney, Agent, or Firm — Edwards Wildman Palmer LLP; Peter F. Corless

(57) ABSTRACT

The present invention relates to a system and a method for starting control of a hybrid vehicle which secures robust drivability when the hybrid vehicle starts. A method for starting control of a hybrid vehicle according to another aspect of the present invention may include: deciding a target torque according to starting demand; analyzing an engaging state of a clutch; calculating a clutch slip torque in a case that the clutch slips; requesting correction of an engine output torque according to the clutch slip torque; and correcting the engine output torque through control of air amount and feedback control of ignition timing according to the correction request of the engine output torque.

5 Claims, 2 Drawing Sheets

SYSTEM AND METHOD FOR STARTING CONTROL OF HYBRID VEHICLE

CROSS-REFERENCE TO RELATED APPLICATION

This application claims priority to and the benefit of Korean Patent Application No. 10-2010-0061506 filed in the Korean Intellectual Property Office on Jun. 28, 2010, the entire contents of which are incorporated herein by reference.

BACKGROUND OF THE INVENTION (a) Field of the Invention

The present invention relates to a system and a method for starting control of a hybrid vehicle which secures robust drivability when the hybrid vehicle starts.

(b) Description of the Related Art

A manual transmission vehicle is provided with various types of clutches (dry type/wet type). The clutches are mounted between an engine and a transmission so as to selectively transmit an engine output torque to the transmission.

When the manual transmission vehicle is started, a driver handles a clutch pedal and an accelerator pedal and controls the engine output torque so as to be supplied as a transmission input torque.

A clutch slip control is performed in an initial starting of the vehicle. The clutch slip control permits the vehicle to be started, reduces shock, jerk, or clutch judder which can occur when starting so as to provide a smooth starting, and prevents stall according to an urgent engine load.

An automatic transmission is provided with a torque converter instead of the clutch. The torque converter can increase the torque transmitted though a fluid-coupling but has a low transmitting efficiency. Therefore, fuel efficiency may be deteriorated.

Recently, because of demands for enhancement of fuel efficiency and reinforcement of exhaust gas regulations, eco-friendly vehicles have been researched. A hybrid vehicle is one type of such eco-friendly vehicles and attracts public attention.

The hybrid vehicle uses an engine and a motor as power sources, and enhances energy efficiency and reduces exhaust gas by selectively using the engine and the motor as the power sources.

In order to minimize cost and torque loss, a clutch operated by fluid, instead of a torque converter, is mounted between the engine and the motor in the hybrid vehicle.

The clutch mounted in the hybrid vehicle connects or disconnects the engine and the motor according to a driving condition such that torque transmitted to the transmission is optimized.

However, if the clutch slip control is not performed stably when connecting the engine with the motor, stall, drop, or flare may occur by overload of the engine. Accordingly, starting shock may occur.

In addition, since the clutch slip is not constant, robust drivability cannot be secured in a repetitive starting mode, and an excessive clutch slip causes clutch judder. Therefore, drivability may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and a method for starting control of a hybrid vehicle having advantages of providing robust drivability by performing a clutch slip control suitably.

One aspect of the present invention is to provide a system for starting control of a hybrid vehicle which includes an engine and a motor being power sources, a clutch connecting or disconnecting power delivery, and a clutch control unit controlling an operation of the clutch. The system may include a hybrid control unit controlling a clutch slip according to a starting demand, calculating a clutch slip torque, and requesting correction of an engine output torque; and an engine control unit controlling an engine speed to follow a target engine speed through a control of air amount and feedback control of ignition timing according to the correction request of the engine output torque received from the hybrid control unit.

The engine control unit may compensate the engine output torque lost by the clutch slip according to the correction request of the engine output torque through the control of the air amount and the feedback control of the ignition timing.

A method for starting control of a hybrid vehicle according to another aspect of the present invention may include: deciding a target torque according to starting demand; analyzing an engaging state of a clutch; calculating a clutch slip torque in a case that the clutch slips; requesting correction of an engine output torque according to the clutch slip torque; and correcting the engine output torque through control of air amount and feedback control of ignition timing according to the correction request of the engine output torque.

The target torque according to the starting demand may be calculated in a case the clutch is completely engaged, and the engine output torque may be controlled to follow the target torque.

The target torque according to the starting demand may be corrected by a clutch slip torque in a case of the clutch slip, and an engine speed may be controlled to follow the target engine speed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 2 is a flowchart of a method for starting control of a hybrid vehicle according to an exemplary embodiment of the present invention.

Figure 1:
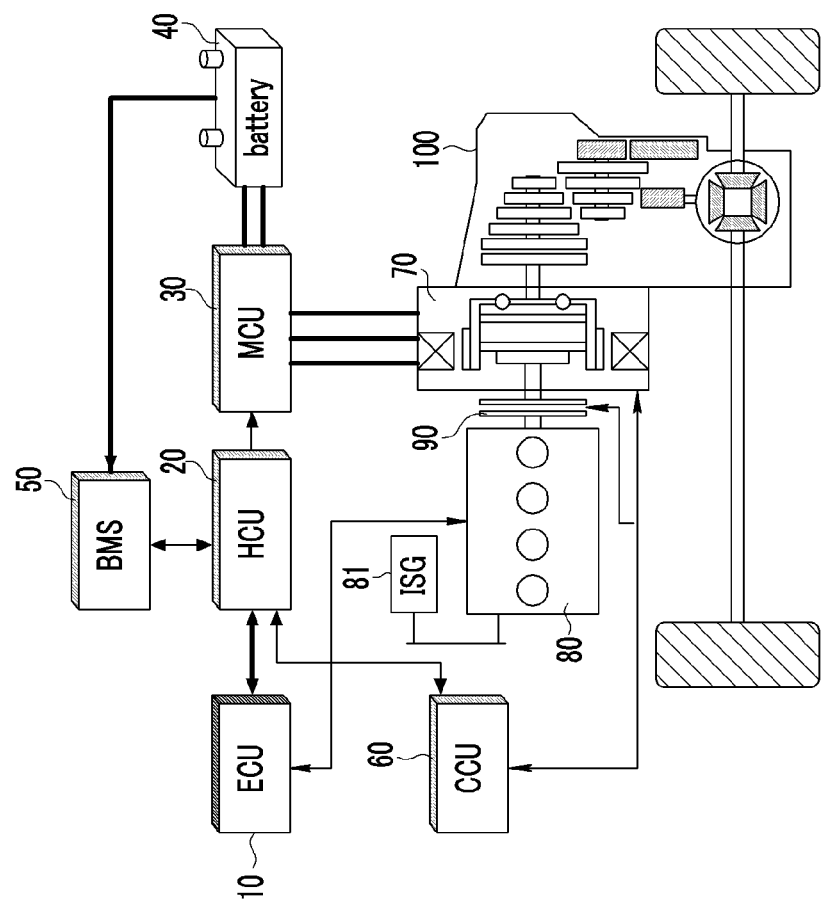
FIG. 1 is a schematic diagram of a system for starting control of a hybrid vehicle according to an exemplary embodiment of the present invention.

| <Description of symbols> | |
|---|---|
| 10: ECU | 20: HCU |
| 30: MCU | 60: CCU |
| 70: motor | 80: engine |

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

FIG. 1 is a schematic diagram of a system for starting control of a hybrid vehicle according to an exemplary embodiment of the present invention.

As shown in FIG. 1, an exemplary embodiment of the present invention includes an engine control unit (ECU) 10, a hybrid control unit (HCU) 20, a motor control unit (MCU) 30, a battery 40, a battery management system (BMS) 50, a clutch control unit (CCU) 60, a motor 70, an engine 80, an ISG 81, a clutch 90, and a transmission 100.

The ECU 10 is connected to the HCU 20 through a network and cooperates with the HCU 20 for controlling an operation of the engine 80.

The HCU 20 controls each controller according to a driving demand and a vehicle state through the network so as to control output torques of the engine 80 and the motor 70, and controls the clutch 90 according to a driving condition and a state of the battery 40 so as to operate the hybrid vehicle at an electric mode (EV), a hybrid mode (HEV), and an engine mode.

The HCU 20 controls a clutch slip according to a target torque through the CCU 60 when a starting demand is detected, calculates a clutch slip torque, and requests correction of an engine output torque to the ECU 10.

The MCU 30 controls an operation of the motor 70 according to the control of the HCU 30, and stores electric power generated at the motor 70 in the battery 40 through a regenerative braking.

The battery 40 supplies the power to the motor 70 at the hybrid mode (HEV) and the electric mode (EV), and is recharged therough the regenerative braking.

The BMS 50 information about a voltage, a current, and a temperature of a battery 40, controls a state of charge (SOC), a recharge current, and discharge current, and transmits the information corresponding thereto to the HCU 20 through the network.

The CCU 60 controls actuators mounted in the transmission 100 according to the control of the HCU 20 so as to control a shift to a target shift-speed, engages or disengages the clutch 90 by controlling hydraulic pressure supplied to the clutch 90, and controls the clutch slip according to the starting demand.

Output torque of the motor 70 is controlled by the control of the MCU 30.

The engine output torque is controlled by the control of the ECU 20, and an intake air amount is controlled by an ETC (not-shown).

The ISG 81 idle stops or starts the engine 80 according to a driving condition of the vehicle.

The clutch 90 is disposed between the engine 80 and the motor 70 and connects or disconnects the engine 80 and the motor 70 according to the drive mode (e.g., the engine mode, the hybrid mode, and the electric mode).

The transmission 100 achieves the target shift-speed by the control of the CCU 60 connected to the HCU 20 through the network.

In addition, the ECU 10 controls the engine output torque through control of air amount and feedback control of ignition timing according to the correction request of the engine output torque received from the HCU 20 through the network so as to maintain a target engine speed.

If it is assumed that ideal and precise information of an engine load is transmitted from the HCU 20 to the ECU 10, the target engine speed can be maintained only by the control of the air amount.

However, since an error always exists in the clutch slip torque calculated by the HCU 20, the ECU 10 controls the engine speed by the feedback control of the ignition timing as well as the control of the air amount so as to eliminate the effect of the error.

For example, a fluid operating the clutch 90 has different hydraulic characteristics according to a temperature thereof, and the hydraulic pressure according to the same signal may be changed in a transient region.

That is, since the calculated clutch slip torque (engine load) can be different from an actual engine load, the feedback control of the ignition timing is performed so as to compensate the difference between the calculated engine load and the actual engine load.

The clutch slip is calculated by the HCU 20 as follows. In addition, an error of the clutch slip may exist according to an error of a friction coefficient and an error of the estimated hydraulic pressure supplied to the clutch.

$$\text{Clutch slip} = \text{estimated hydraulic pressure supplied to clutch}/(\mu \times A \times r \times n)$$

Herein, $\mu$ represents the friction coefficient, A represents a contact area, r represents an effective radius, and n represents the number of clutch disks.

During the ECU 10 controls the engine speed to follow the target engine speed, the error of the clutch slip torque should be within a predetermined range for effectively performing the feedback control.

That is, since the clutch slip torque is calculated within a controllable error range, the hydraulic pressure supplied to the clutch 90 should be lower than a maximum allowable hydraulic pressure supplied to the clutch 90. The maximum allowable hydraulic pressure supplied to the clutch 90 is calculated as follows.

$$\text{Maximum allowable hydraulic pressure} = \text{available engine torque}/(\mu \times A \times r \times n)$$

Herein, $\mu$ represents the friction coefficient, A represents a contact area, r represents an effective radius, and n represents the number of clutch disks.

The available engine torque differs according to a coolant temperature and an oil temperature. Therefore, the available engine torque is acquired through a number of experiments.

A method for starting control of a hybrid vehicle according to an exemplary embodiment of the present invention will be described in detail referring to FIG. 2.

In a state that the hybrid vehicle according to the present exemplary embodiment is stopped or drives at the electric mode (EV), the HCU 20 detects the starting demand of the driver at a step S101 and calculates a target torque according to the starting demand of the driver at a step S102.

In addition, the HCU 20 detects a current state of the clutch 90 by analyzing the information received from the CCU 60 at a step S103, and determines whether the clutch 90 is completely engaged at a step S104.

If the clutch 90 is completely engaged at the step S104, the HCU 20 transmits the target torque of full load (F/L) or partial load (P/L) calculated according to the starting demand of the driver to the ECU 10 connected thereto through the network at a step S105.

After that, the ECU 10 corrects the engine output torque according to the target torque of the full load (F/L) or the partial load (P/L) transmitted from the HCU 10 through the network by the control of the air amount and the feedback control of the ignition timing and controls the engine output torque to follow the target torque at a step S106.

If the clutch 90 is not completely engaged at the step S104, the HCU 20 decides that the current state of the clutch 90 is a clutch slip state at a step S107 and calculates the clutch slip torque at a step S108.

After the clutch slip torque is calculated at the step S108, the HCU 20 requests correction of the engine output torque to the ECU 10 through the network so as to compensate a load loss of the engine 80 by the clutch slip at a step S109.

The HCU 20 transmits the target torque according to the starting demand as well as the correction request of the engine output torque to the ECU 10.

Therefore, the ECU 10 controls the engine speed to follow the target engine speed according to the target torque and the clutch slip torque received from the HCU 20 by the control of the air amount and the feedback control of the ignition timing at a step S110. Since the engine speed is closely related to the engine output torque, the ECU 10 may control the engine output torque to follow the corrected engine output torque.

If it is assumed that ideal and precise information of an engine load is transmitted from the HCU 20 to the ECU 10, the target engine speed can be maintained only by the control of the air amount.

However, since an error always exists in the clutch slip torque calculated by the HCU 20, the ECU 10 controls the engine speed by the feedback control of the ignition timing as well as the control of the air amount.

The fluid operating the clutch 90 has different hydraulic characteristics according to a temperature thereof, and the hydraulic pressure according to the same signal may be changed in a transient region.

Since the calculated clutch slip torque (engine load) can be different from an actual engine load, the feedback control of the ignition timing is performed so as to compensate the difference between the calculated engine load and the actual engine load.

At this time, the error of the clutch slip may exist according to the error of the friction coefficient and the error of the estimated hydraulic pressure supplied to the clutch 90. Therefore, the ECU 10 controls the engine speed to follow the target engine speed only when the error of the clutch slip torque should be within the predetermined range. It is noted that the predetermined range of error may vary based on a variety of factors, for example, according to the type of vehicle, transmission engine, etc. and is not particularly limited and could be determined by one of skill in the art. However, an exemplary predetermined range of error can be about 0-10%.

It is exemplarily described that the present invention is applied to the hybrid vehicle, but the present invention can be applied to any automatic transmission (CVT, DCT, AMT, and so on) provided with the clutch. Since efficiency of the clutch is higher than that of the torque converter, fuel consumption and cost may further be reduced if applying the present invention to the automatic transmission.

According to the present invention, stall or drop may not occur by calculating a clutch slip according to a starting demand of a driver and compensating an engine output torque according to the clutch slip. Therefore, an operation of the engine may be stabilized and drive reliability may be enhanced.

In addition, starting responsiveness and initial acceleration feel according to a driver' will may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for starting control of a hybrid vehicle which comprises an engine and a motor being power sources, a clutch connecting or disconnecting power delivery, and a clutch control unit controlling an operation of the clutch, the system comprising:
   a hybrid control unit controlling a clutch slip according to a starting demand, calculating a clutch slip torque, and requesting correction of an engine output torque; and
   an engine control unit controlling an engine speed to follow a target engine speed through a control of air amount and feedback control of ignition timing according to the correction request of the engine output torque received from the hybrid control unit.

2. The system of claim 1, wherein the engine control unit compensates the engine output torque lost by the clutch slip according to the correction request of the engine output torque through the control of the air amount and the feedback control of the ignition timing.

3. A method for starting control of a hybrid vehicle, comprising:
   deciding a target torque according to starting demand;
   analyzing an engaging state of a clutch;
   calculating a clutch slip torque in a case that the clutch slips;
   requesting correction of an engine output torque according to the clutch slip torque; and
   correcting the engine output torque through control of air amount and feedback control of ignition timing according to the correction request of the engine output torque.

4. The method of claim 3, wherein the target torque according to the starting demand is calculated in a case the clutch is completely engaged, and the engine output torque is controlled to follow the target torque.

5. The method of claim 3, wherein the target torque according to the starting demand is corrected by a clutch slip torque in a case of the clutch slip, and an engine speed is controlled to follow the target engine speed.

* * * * *